US006589308B1

(12) United States Patent
Gianelo

(10) Patent No.: US 6,589,308 B1
(45) Date of Patent: Jul. 8, 2003

(54) CABINET FOR HOUSING A COMPUTER WORKSTATION

(76) Inventor: Angelo Gianelo, P.O. Box 359, Salt Lake City, UT (US) 84110

( * ) Notice: Subject to any disclaimer, the term of this patent is extended or adjusted under 35 U.S.C. 154(b) by 0 days.

(21) Appl. No.: 09/572,647

(22) Filed: May 17, 2000

Related U.S. Application Data

(63) Continuation of application No. 09/032,748, filed on Feb. 27, 1998, now abandoned.
(60) Provisional application No. 60/045,693, filed on Feb. 28, 1997.

(51) Int. Cl.$^7$ .............................. B01D 46/00; H05K 7/20
(52) U.S. Cl. .................. 55/385.6; 55/481; 454/184; 361/685; 312/213; 312/223.1; 312/223.3; 312/223.6
(58) Field of Search ........................ 55/385.1, 385.6, 55/481, 485, 486, DIG. 31, 385.2; 454/184; 361/685; 312/213, 223.1, 223.2, 223.6, 223.3, 236, 263, 296

(56) References Cited

U.S. PATENT DOCUMENTS

| 3,357,763 A | * | 12/1967 | Toper ........................ 312/236 |
| 3,364,838 A | * | 1/1968 | Bradley ...................... 312/213 |
| 3,469,031 A | * | 9/1969 | Setchell .................... 55/385.6 |
| 4,517,512 A | * | 5/1985 | Petrich et al. .............. 361/683 |
| 4,576,578 A | * | 3/1986 | Parker et al. ................ 312/24 |
| 4,754,397 A | * | 6/1988 | Varaiya et al. ............. 361/685 |
| 4,827,439 A | * | 5/1989 | Licht ......................... 361/681 |
| 4,861,121 A | * | 8/1989 | Gotz ....................... 312/223.3 |
| 5,160,357 A | * | 11/1992 | Faber ....................... 55/385.6 |
| 5,163,870 A | * | 11/1992 | Cooper ..................... 55/385.6 |
| 5,216,579 A | * | 6/1993 | Basara et al. .............. 361/683 |
| 5,232,277 A | * | 8/1993 | Cassady et al. ............. 312/296 |
| 5,281,018 A | * | 1/1994 | Cullinan ................... 312/223.2 |
| 5,447,367 A | * | 9/1995 | Wei ........................ 312/223.2 |
| 5,462,569 A | * | 10/1995 | Benjamin .................. 55/385.6 |
| 5,475,562 A | * | 12/1995 | Gow .......................... 312/236 |
| 5,927,386 A | * | 7/1999 | Lin ............................ 361/695 |
| 5,935,282 A | * | 8/1999 | Lin ........................... 55/385.6 |
| 5,942,017 A | * | 8/1999 | Winkle, Sr. ................ 55/385.6 |
| 5,955,955 A | * | 9/1999 | Corcoran, Jr. et al. ...... 361/695 |
| 6,007,169 A | * | 12/1999 | Li et al. .................... 55/385.6 |
| 6,110,245 A | * | 8/2000 | Schlag et al. .............. 55/385.6 |
| 6,142,590 A | * | 11/2000 | Harwell ................... 312/223.1 |
| 6,151,212 A | * | 11/2000 | Schwenk et al. ........... 361/695 |
| 6,164,369 A | * | 12/2000 | Stoller ........................ 454/184 |
| 6,206,495 B1 | * | 3/2001 | Peterson .................... 312/283 |
| 6,213,866 B1 | * | 4/2001 | Impellizzeri ................ 454/184 |
| 6,280,319 B1 | * | 8/2001 | Wong et al. ................ 454/184 |
| 6,309,295 B1 | * | 10/2001 | Clarke et al. ............... 454/184 |
| 6,310,770 B1 | * | 10/2001 | Negishi ...................... 454/184 |
| 6,315,656 B1 | * | 11/2001 | Pawlowski ................. 454/184 |
| 6,337,795 B1 | * | 1/2002 | Wang ......................... 454/184 |
| 6,353,532 B1 | * | 3/2002 | Landrum et al. ......... 312/223.1 |

* cited by examiner

*Primary Examiner*—Duane Smith
*Assistant Examiner*—Minh-Chau T. Pham
(74) *Attorney, Agent, or Firm*—TraskBritt

(57) ABSTRACT

A console for enclosing one or more component elements of a computer system is disclosed. The console includes a cabinet structure which defines an interior space configured to receive one or more component elements of the computer system. The cabinet defines an inlet port and one or more discharge ports. The inlet port is fitted with a fan on the interior surface of a sidewall forming the cabinet. Releasably mounted on the external sidewall which defines the inlet port is a filter positioned to filter air prior to its introduction into the interior space of the cabinet through the inlet port. The filter is adapted to be slidably removed from its association with the cabinet.

12 Claims, 6 Drawing Sheets

CABINET FOR HOUSING A COMPUTER WORKSTATION

CROSS-REFERENCE TO RELATED APPLICATIONS

This application is a continuation of application Ser. No. 09/032,748, filed Feb. 27, 1998, now abandoned, which claims the benefit of the filing date of U.S. Provisional Patent Application Serial No. 60/045,693, filed Feb. 28, 1997.

BACKGROUND OF THE INVENTION

1. Field of the Invention

This invention relates to cabinetry configured for receiving and retaining a computer system or component elements thereof. More specifically, the invention is directed to a cabinet for housing and protecting one or more component elements of a computer system especially in a hazard filled environment.

2. State of the Art

The proliferation of computers in modern society has led to their implementation in a variety of environments. Although many of these environments are relatively free of dust, fumes, chemicals or other environmental hazards which may be harmful to the continued and proper operation of the various elements of the computer system, many computer systems are presently employed in environments wherein such environmental factors exist. For example, many computer systems are presently being utilized in factories, automobile repair facilities, manufacturing and processing plants, or in a variety of other heavy industrial applications. A number of environmental factors exist at these types of work site in sufficient quantities that continued proper operation of an unprotected computer system in those environments is unrealistic.

Recognizing the need for providing a measure of protection for the more sensitive components of a computer system, efforts have been made in the art to provide various structures adapted for shielding or otherwise sheltering one or more of the elements of the computer system. For example, in U.S. Pat. No. 4,827,439 (Licht) issued May 2, 1989, an operator interface console for protecting a process control equipment such as an industrial computer in a harsh factory environment is disclosed. The structure includes a console unit wherein a video display unit of a computer system is positioned behind a sealed door, having a window to permit an operator to view the display unit while the door is closed. The door is positioned at an ergonomically desirable oblique angle facing somewhat downwardly to facilitate clear viewing of the display unit under changing lighting, dust and other conditions as encountered in process control situations.

U.S. Pat. No. 4,861,121 (Gotz) issued Aug. 29, 1989 discloses a cabinet arrangement adapted for efficiently positioning the various component elements of a computer system to minimize space taken up by those elements. The Gotz construction includes a cabinet which encloses the central processing unit of the computer system oriented at an angle to the horizon. In required circumstances the doors may be closed to shelter the components.

U.S. Pat. No. 5,281,018 (Cullinan) issued Jan. 25, 1994 discloses a protective enclosure for components of a computer system including a video display monitor, printer, keyboard and a central processing unit. The structure is specifically directed for use in an industrial environment. The entire computer system is completely enclosed within a housing while the keyboard is pivotally mounted for movement about a generally horizontally disposed axis.

Various other cabinetry systems adapted for containing one or more components of a computer system are those shown in U.S. Pat. No. 4,754,397 (Varaiya et al.) issued Jun. 20, 1988, U.S. Pat. No. 5,216,579 (Basara et al.) issued Jun. 1, 1993, U.S. Pat. No. 4,517,512 (Petrich et al.) issued May 14, 1985, U.S. Pat. No. 5,447,367 (Wei) issued Sep. 5, 1995.

To date a number of the cabinetry systems configured for receiving, retaining and protecting computer systems involve large rather cumbersome units specifically adapted for containing most, if not all, of the component elements of a computer system. While such structures and cabinetry may be useful in many industrial environments, the size, cost and space requirements of such cabinetry often render such structures unusable in light industrial environments. It is recognized that of all the component elements of a computer system, the central processing unit (CPU) is at once not only the most critical component element of the computer system, but furthermore is also the element which is most subject to damage from dust, moisture, chemical fumes and other environmental hazards which may be found in the work place. While conventional CPUs generally have a small fan mounted within the housing of the computer unit in order to cool the unit thereby preventing overheating, placement of the CPU in a confined area has been shown to be hazardous in that the operation of the internally housing fan is oftentimes insufficient to properly cool the CPU and prevent overheating.

There continues to be a need for a cabinetry system adapted for protecting one or more elements of the computer system in industrial work environments.

BRIEF SUMMARY OF THE INVENTION

A cabinet console configured for retaining one or more elements of a computer system for protecting those element in a hazardous environment is disclosed. The cabinet includes a plurality of sidewalls interconnected to one another along their upright edges to form a housing. The sidewalls of the housing are fitted with a top or cover together with a floor or bottom. The floor, top and sidewalls are secured to one another to form a generally airtight structure which defines an interior space dimensioned and otherwise configured to receive and retain one or more elements of a computer system.

The cabinet formed by the association of the sidewalls, top and bottom also defines a door which is pivotally mounted and secured to one of the sidewalls. The door in association with an opening defined within the sidewall provides an egress as well as an ingress into the interior space of the cabinet. In some constructions, the interior surface of the door is fitted with a sealing means positioned proximate the perimeter of the door which is disposed to engage the sidewall of the cabinet about the perimeter of the opening in the sidewall over which the door closes.

One or more of the sidewalls of the cabinet defines an inlet port. Positioned on the inside of the cabinet is a power-operated, fan assembly which is positioned to draw air through the inlet port from the environment and thereafter direct that stream of pressurized air into the interior space of the cabinet creating a positive pressure inside of the cabinet relative to the environment. In some configurations, a plenum is constructed within the body of the cabinet about the inlet port. In these particular constructions, the fan is associated with the plenum to draw air from the plenum into the interior space of the cabinet.

Positioned preferably on the outer external surface of the cabinet over and atop the inlet port is a filter. The filter is detachably mounted to the cabinet. In some constructions, a plurality of channels is defined on the external surface of the cabinet. The channels form a passageway through which the filter is slidingly inserted or retracted. The filter is slidingly inserted through the channels into engagement over the inlet port. The filter functions to filter the air being drawn into the inlet port from the environment.

The cabinet also defines a number of outlet ports. In the preferred construction, the outlet ports are disposed in the external sidewalls, top or bottom of the cabinet and location removed from the inlet port. In some constructions, the outlet ports are spaced from the inlet port to encourage an air travel path over the housed computer component to maximize the opportunity to absorb heat from within the cabinet and thereby serve as a heating means for the cabinet.

DETAILED DESCRIPTION OF THE INVENTION

Figure 1:
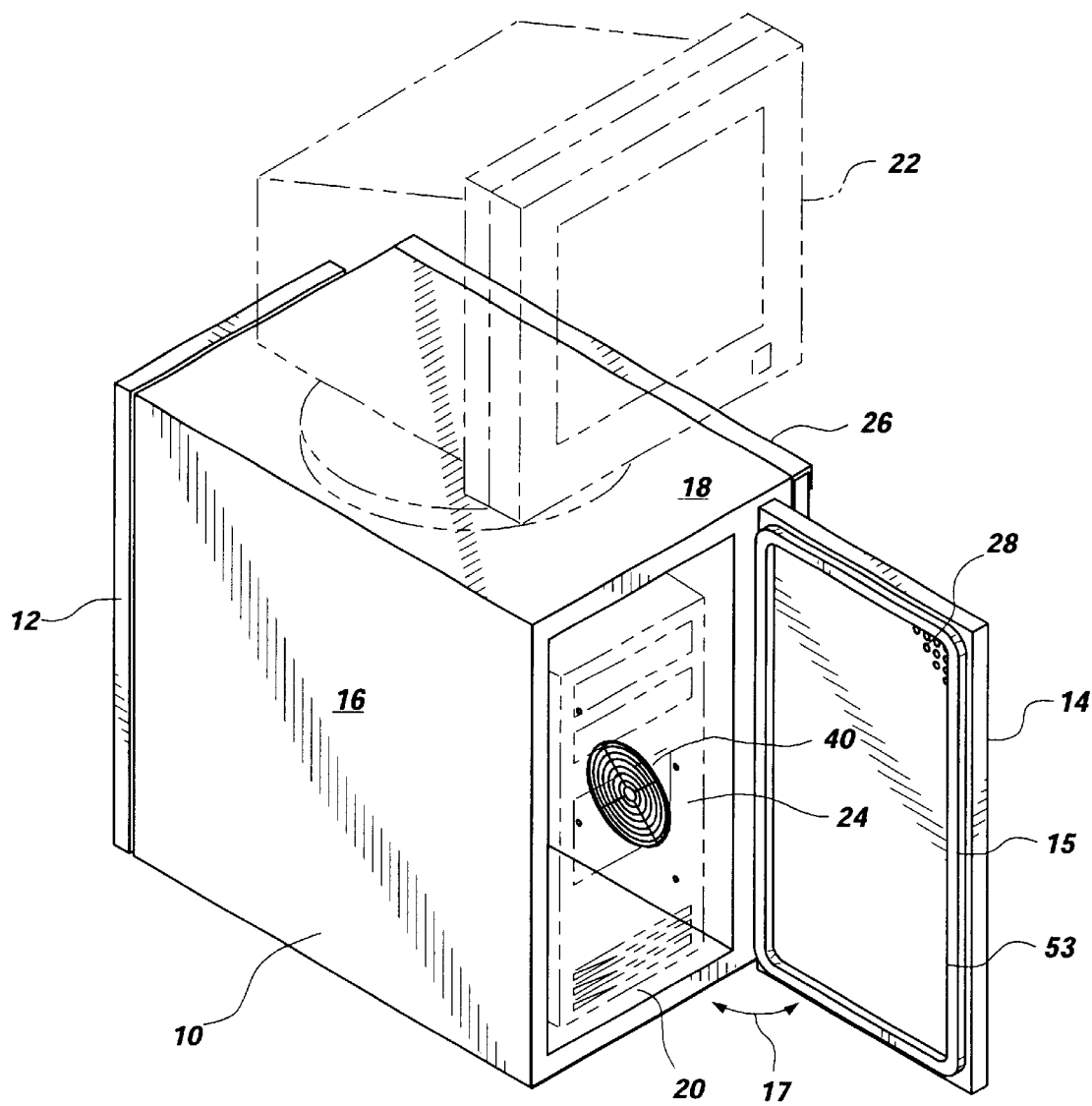
FIG. 1 is an elevated perspective view of the first embodiment of a cabinet of the instant invention showing the CPU of a computer system installed within the cabinet while the video display monitor is positioned in ghost phantom atop the cabinet.

As shown in FIG. 1, a computer cabinet 10 of the instant invention is formed by a plurality of planar metal sidewall elements 16, 26. Panels 16 and 26 form upstanding sidewalls of the cabinet. The planes of each of these two elements 16, 26 are oriented substantially parallel from one another and the panels are positioned spacedly apart from one another. The front panel 19 is interconnected along its upstanding vertical edges with the panel 16 and the panel 26. Likewise a rear panel 21 is also joined along its vertical edges to panel 16 and 26 to form a generally rectangularly configured box-like structure.

Figure 2:
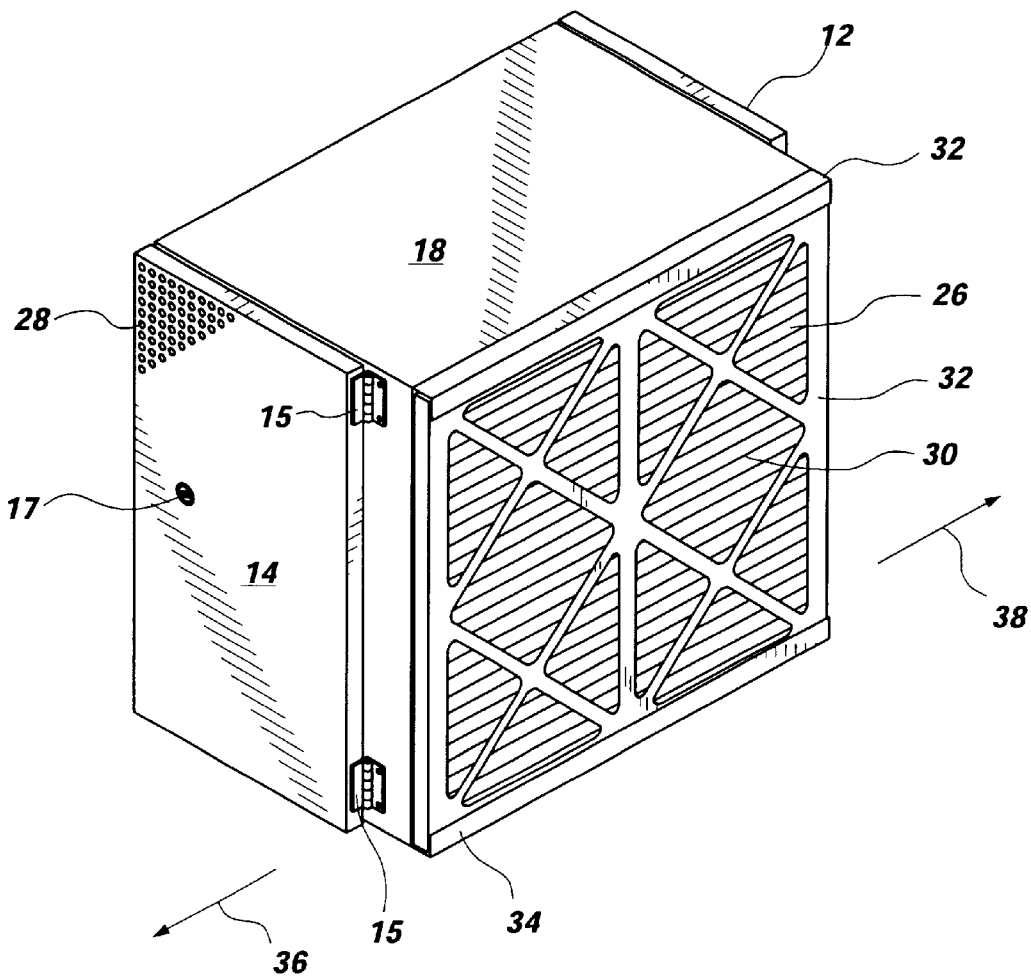
FIG. 2 is an elevated perspective view of the cabinet of FIG. 1 illustrating the placement of the filter assembly of the cabinet sidewall.
Figure 3:
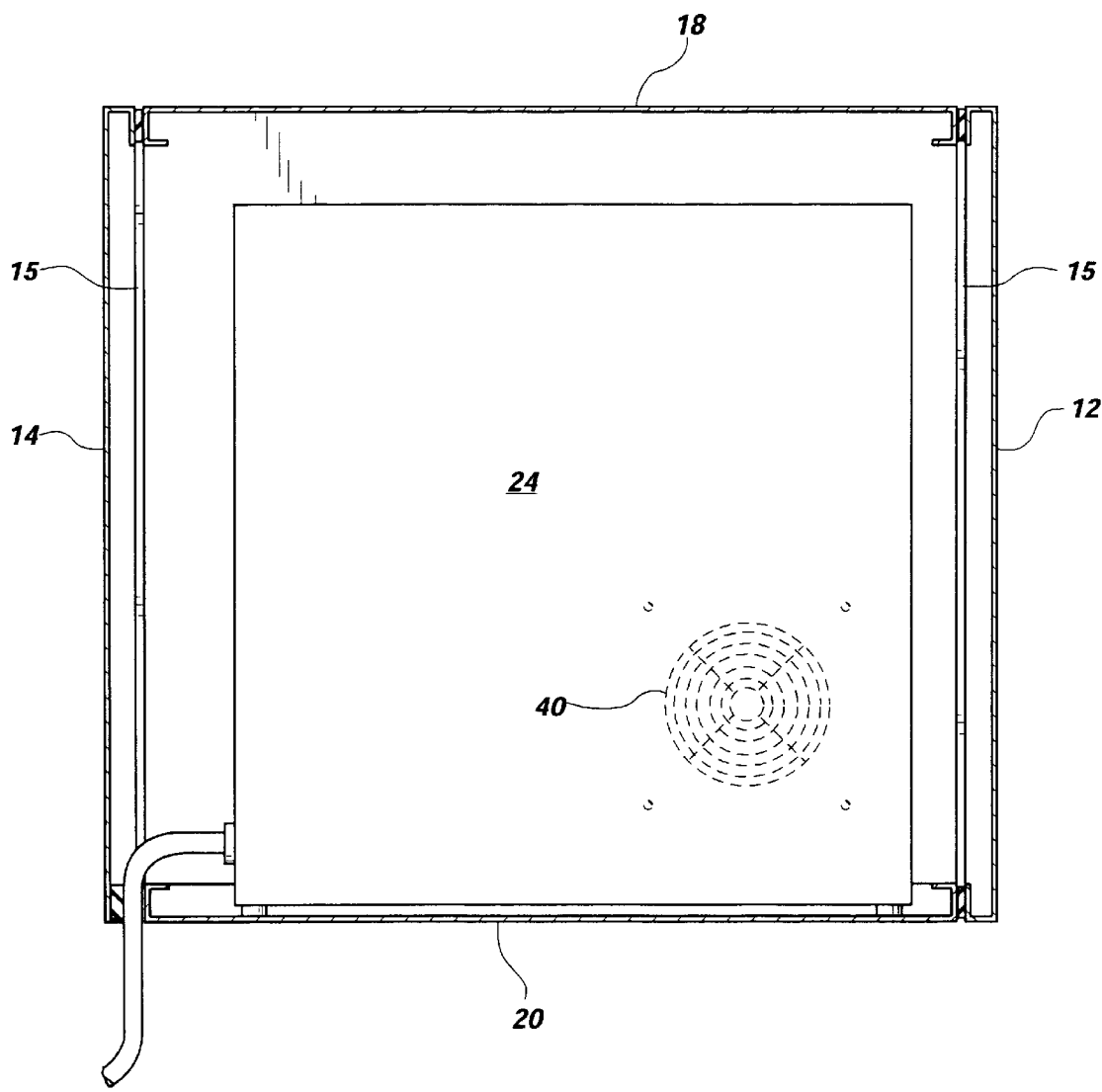
FIG. 3 is a cross-sectional view of the cabinet of FIG. 2 taken along section lines 3—3 showing in the interior cavity of the cabinet.

A top member 18 is positioned atop the panels 16, 17, 26 and 21. Furthermore, a flat, planar bottom or floor 20 is positioned horizontally and is interconnected on its edges with panels 16, 17, 26 and 21 to thereby define a generally box-shaped rectangularly cross-section structure having a hollow interior space. The front panel 19 defines an opening 23 therein which is dimensioned and sized to serve as an ingress as well as an egress in the interior space of cabinet 10. As shown, the opening 23 may be generally rectangularly configured. A door 14 is pivotally secured to the front panel 19 by hinges as shown in FIG. 2 which permit the door to swing generally in the directions indicated by arrow 17 allowing access to the interior space of the cabinet 10. The door 14 includes a rubber seal 53 which is positioned about the perimeter to extend along the perimeter of the door 14 on an interior surface of the door. The seal is dimensioned and positioned to form a sealing engagement against the sidewall 19 when the door 14 is in the closed condition such as shown in FIG. 2. Door 14 may furthermore include a number of apertures 28 which extend through the thickness of the door and thereby provide a plurality of outlet ports from the rear space of the cabinet.

The particular embodiment shown in FIG. 1, a door 12 is likewise mounted to the cabinet 10 in a manner similar to the attachment of door 14 to the cabinet. While not shown, it should be assumed door 12 is mounted to the cabinet 10 by means of a plurality of hinges oriented similarly to hinges 15 of door 14.

The top 18 is fabricated of a material of sufficient strength and rigidity to support a video display monitor 22 being placed thereon.

The wall 26 of the cabinet 10 defines an aperture there through hereinafter known as an inlet port. Inlet port designated generally 40 is a means whereby air from the environment may be introduced into the interior space of the cabinet 10. In drawing FIG. 2, a filter 30 is mounted on the exterior surface of the sidewall 26, filter 30 is formed of a frame structure 31, filtered medium 32 which is retained within the structure 31.

The nature of the application and the environment in which the cabinet is to be used determine the filtering capacity of the filter utilized in the cabinet. In the present construction, it has been found that a conventional furnace filter may be used as the filter 30 of the instant invention. In other applications, the filter medium may be adjusted to provide filtering capability down to particles having dimensions of one micron or possibly less. The filter 30 is removably secured to the cabinet 10 by a pair of channels 32 and 34. As shown, each of these channels 32 and 34 defines a generally U-shaped channel configured to receive the edges of the filter 30. Channel 32 is formed by an inverted L-shaped member which is secured to the top 18 or side 26 of the cabinet to form an inverted U-shaped channel assembly.

Channel 34 is formed by a L-shaped channel secured to the sidewall 26 to form a upstanding U-shaped channel. The longitudinal axes of channel 32 and 34 are respectively oriented parallel to one another so as define a channel having a generally constant width. Channels 32 and 34 are dimensioned and configured to receive the sliding engagement of the filter 30 along the directions indicated by arrows 36 and 38. On the interior surface of wall 26 is a fan 41 which is configured to sealingly engage and surround the inlet aperture within the sidewall 26. Connected with a source of power, the fan 41 draws air from the environment through the filter 30 thereafter from that aperture 39.

The air is directed through the fan 41 and into the interior space of the cabinet 10 and is thereafter circulated throughout the cavity thereby absorbing heat from the CPU. The air is directed outwardly from the cabinet under positive pressure through the outlet ports within the door 14. It should also be understood that the door 12 may similarly define a number of outlet ports which constitutes a means by which the heated air may exit the internal cavity of the cabinet 10.

Figure 4:
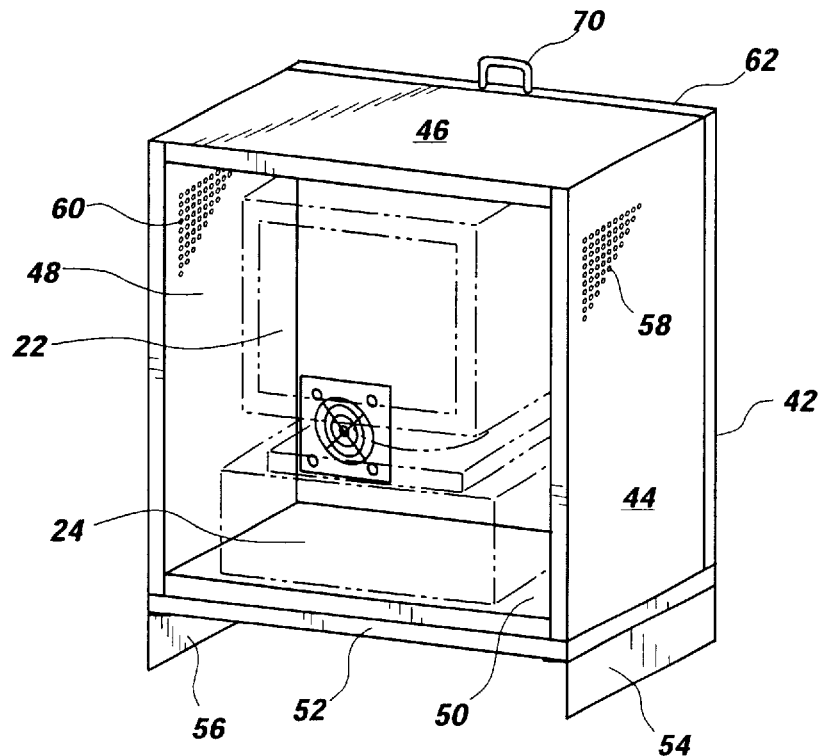
FIG. 4 is an elevated perspective view of a second embodiment of the invention wherein a central processing unit as well as the video display monitor are shown retained within the internal cavity of the computer cabinet.
Figure 5:
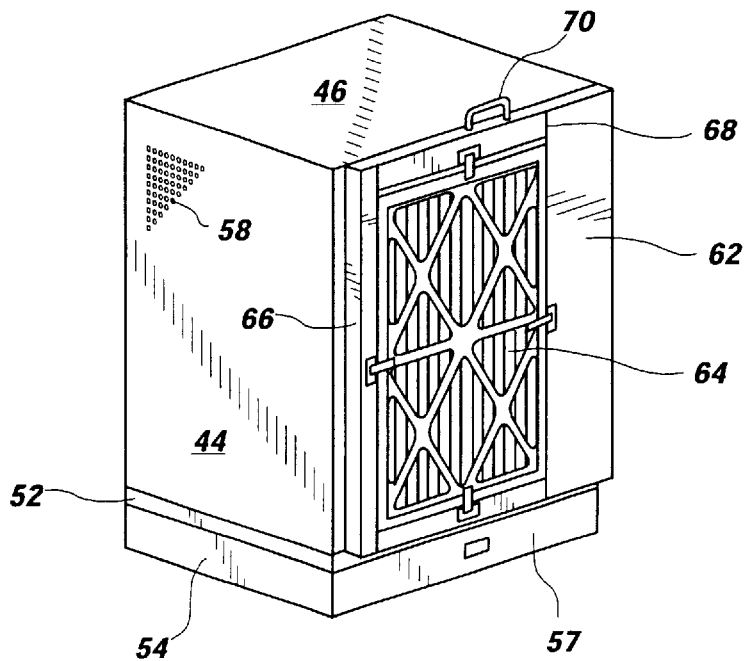
FIG. 5 is an elevated perspective view of the cabinet of FIG. 4 showing the back of that cabinet and the filter assembly associated with the cabinet.

FIGS. 4 and 5 illustrate a second embodiment of the instant invention. In this particular embodiment not only is the CPU 24 maintained within the interior space of the cabinet 42, but furthermore the interior space of the cabinet is formed sufficiently large to also receive and retain a video display unit 22 of the computer system. In this particular construction, the cabinet 42 is formed by an upstanding sidewall 44 and 48 each of which is formed by a singular planar panel which also defines a plurality of apertures there through 58 and 60 respectively. There apertures define outlet ports for the interior space of the cabinet 42. The back of the cabinet is formed by a planar panel 62 which defines an opening therein forming the inlet port of the interior space of the cabinet.

Similar to the embodiment illustrated in FIG. 1, the inlet port 68 is sealingly covered by a filter 64, which in configuration is similar to the filter described heretofore i.e., having a generally rigid frame 65 and a medium 67 retained within that frame. Part of the cabinet is formed by a clear transparent panel 61 which serves to generally seal the interior space of the cabinet walls, thereby providing a means by which the user may view the video display unit while the video display unit is protectively retained within the housing of cabinet 42. The floor of the cabinet is formed by a panel 50 which is mechanically associated with the upstanding sidewalls 44, 62 and 48. The top of the cabinet 42 is formed by a top 46 which is connected with the upstanding sidewalls 44, 48 and 62 along its edges. A clear transparent panel 61 which forms the fourth upstanding sidewall is also secured to the panels 44, 48, 46 and 50. In some embodiments, the panel 61 may be hingedly secured to either one of the sidewalls 48 and 44 to form a door or window which may be pivotally rotated about a vertical axis thereby providing an ingress into the interior cavity of the cabinet 42. The cabinet 42 is positioned atop a support structure formed by a horizontally disposed panel 52 and a plurality of upstanding vertically oriented panels 54, 56 and 57. As shown in FIGS. 4 and 5, panels 54 and 56 each comprise a generally rectangular planar panel. Panels 54 and 56 are positioned spacedly from one another such that their longitudinal axes are oriented parallel. Back panel 57 has a longitudinal axis oriented at 90 degrees from the plane of panels 54 and 56 and is secured at its upstanding edges to panels 54 and 56 to form a generally U-shaped configuration, when viewed from above. Panels 54, 56 and 57 are secured to the horizontal panel 52 to define a rectangularly cross-sectioned recess area 59 dimensioned to receive and releasably retain a keyboard of the computer system. The recess provides a housing which generally shelters the keyboard from the environment when the keyboard is not in use. When the user wishes to operate the system, the keyboard is pulled outwardly from the recess 59 and used. Upon terminating use, the user simply pushes the keyboard back in the direction indicated by arrow 63 back into the recess 59 defined by the panels 54, 56, 57 and 52.

As shown in FIG. 5, the sidewall 62 of the cabinet 42 includes a pair of uprightly positioned channels 66 and 68 which are each defined by an elongate extrusion similar to the extrusions of 32 and 34 of the embodiment shown in FIG. 2. Filter 64 is fitted with a handle 70 which permits the user to vertically raise the filter 64 in the direction indicated by arrow 71 thereby removing the filter 64 from its association with the cabinet 42. The cabinet 42 is also fitted with a fan assembly 73 which is mounted on the interior wall formed by the sidewall 62. Similarly as in the prior disclosed embodiment, the fan 73 is mounted over and atop the inlet port defined within wall 62 so as to form a sealing engagement with that in that port thereby providing means whereby the fan may be operated to draw air from the environment through the filter 64 thereafter through the inlet port defined in sidewall 62 and thereafter through the fan and into the interior of the cabinet 42. The fan operates to create a positive pressure within the cavity of the cabinet 42 thereby precluding the entry of environment air through the cabinet except through the inlet port. As the air is circulated within the interior cavity, the air flow over and through the CPU 24, as well as over the video display monitor 22, is heated by those components of the computer system. The heated air is subsequently discharged from the interior cavity of the cabinet 42 through discharge ports 58 and 60 defined within sidewalls 44 and 48.

Figure 6:
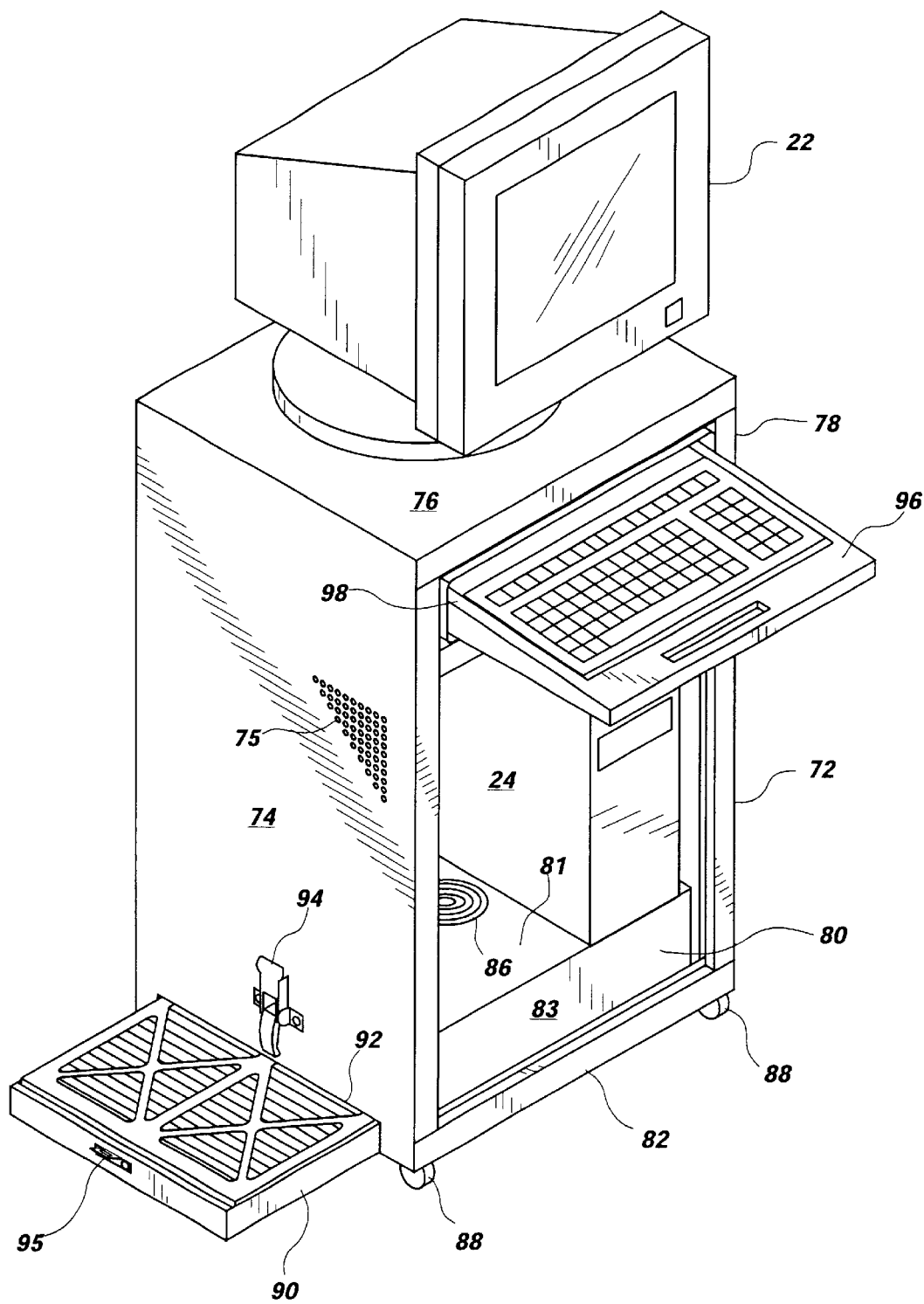
FIG. 6 is an elevated perspective view of a third embodiment of the invention illustrating a central processing unit as well as a computer keyboard being retained within the body of the computer cabinet.

A third embodiment of the invention is disclosed in FIG. 6. In this embodiment, the cabinet 72 is formed by a plurality of upstanding sidewalls 74 that are similar to the previously described embodiments. In this particular embodiment, the filter is mounted on the floor of the cabinet 72. As further shown, a plenum 83 comprising a plurality of upstanding sidewalls and a top cover 81 is positioned over and atop to surround the inlet port of the cabinet 72. The plenum 83 forms a sealing engagement around the inlet port such that any entry through the inlet port is directed into the plenum. Fan 86 is mounted with the plenum. The inlet port of the cabinet 72 is covered by a filter 90 having a configuration and structure similar to those previously described. In this embodiment, the filter is slidably received within channel 92 defined within the lower reaches of the cabinet 72. Filter 90 is adapted for lateral displacement in the directions indicated by arrows 91 and 93 and therefore is slidable into engagement with the inlet port. Furthermore the filter 90 may be removed from association with the cabinet 72 by merely sliding the filter 90 in the direction indicated by arrow 91.

A locking mechanism 94 is shown mounted to the sidewall 74. The locking mechanism 94 includes a pivoted lever adapted to engage a retaining member 95 created on the filter 90 and form a releasably detachable engagement. When engaged, the locking mechanism 94 serves to retain the filter 90 in engagement. Sidewall 74 defines a plurality of outlets 75. The cabinet 72 also defines a generally rectangular cross-sectioned recess 98 configured and dimensioned to slidably received 96 of the computer system. Recess 98 indicated is configured to receive the keyboard 96 permitting the user to slidably pull the keyboard 96 outwardly to the working orientation illustrated in FIG. 7.

Top 76 of the cabinet 72 is fabricated of a material of sufficient integrity to support the weight of monitor 22. The front of the cabinet 72 includes a pivotedly mounted clear panel door 80.

Figure 7:
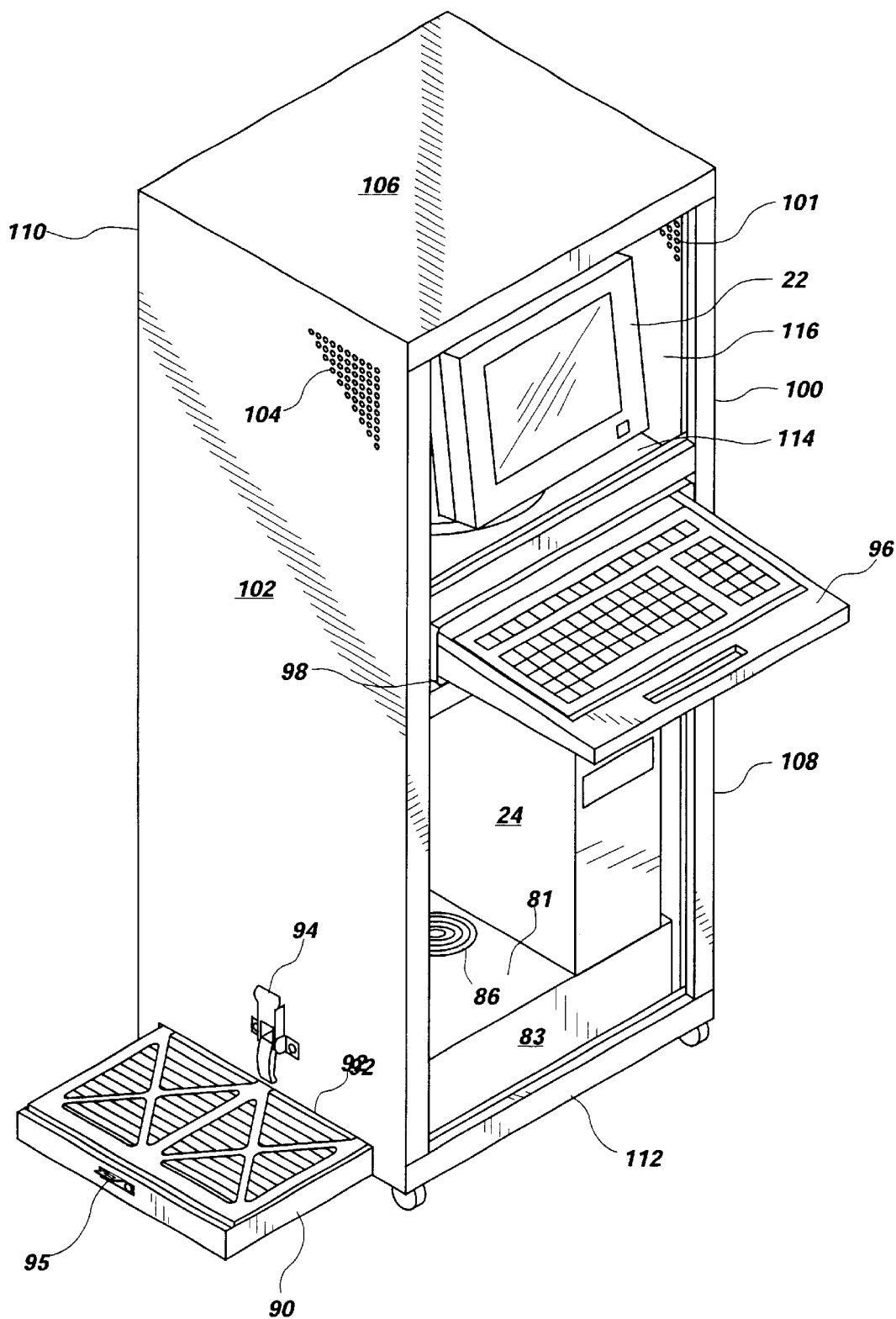
FIG. 7 is an elevated perspective view of a fourth embodiment of the instant invention wherein the central processing unit, the computer keyboard as well as the video display monitor are all housed within the body of the computer cabinet.

FIG. 7 illustrates a fourth embodiment of the instant invention wherein a cabinet 108 is adapted to retain not only the CPU 24, but furthermore the keyboard 96 as well as the video display unit 22. In this particular embodiment, the sidewalls 102, 108 and 110 are extended vertically to define an interior space of sufficient dimension to receive and retain all the three of the aforementioned computer components. Similar to the embodiment described in FIG. 6, this particular embodiment utilizes a filter 90 which is mounted near the bottom 112 of the cabinet 108. The filter 90 is slidably received within a channel 92 whereby upon a fill insertion of the filter 90 within the channel 92, the filter is positioned over and atop an inlet port defined within the bottom 112 of the cabinet 108. Referring to the embodiment of FIG. 6, a plenum 83 is positioned over and atop the inlet port. A fan 86 is associated with the plenum as a means of drawing air from the environment through the filter 90 and thereafter into the plenum 83 and subsequently through the fan 86 and into the interior compartment or interior space of the cabinet 108.

Likewise in the embodiment of FIG. 6, the computer keyboard 96 is mounted within a recess 98 dimensioned and configured to slidably receive the keyboard 96. This particular embodiment as well as in FIG. 6, the keyboard 96 may be slidably inserted into the recess in the direction indicated by arrow 63. Sidewalls 110, 102 and 100 of the cabinet 108 may each include outlet ports 104 and 101 in each of those panels proximate the top 106.

The compartment of the cabinet 108 is configured to facilitate air flow from the compartment enclosing the CPU 24 upward pass the recess adapted for receiving and retaining keyboard 96 and into the compartment enclosing the video display unit 22. As air is drawn by the fan 86 from the environment through the filter into the plenum and thereafter into the compartment housing, the air is subsequently directed into the compartment housing of the video unit 22 and thereafter outward into the environment through outlet ports 101 and 104.

Furthermore to the embodiment disclosed in FIG. 6, the instant embodiment of FIG. 7 may also include one or more doors 83 which are mounted on the front of the cabinet 108 to enclose the front lips of the compartments of unit 22. Preferably doors 83 are manufactured of a clear, transparent material which permits the user to see through the panels without opening the door.

It is to be understood that the descriptions of the various illustrated embodiments are merely illustrative of the various concepts of the invention. The essence of the invention is more disclosed in the claims which are appended hereto.

What is claimed is:

1. A console for housing a computer central processing unit adapted for protecting said computer central processing unit in a harsh environment, said console comprising:
   a cabinet defining an interior space dimensioned to receive and retain said central processing unit;
   said cabinet defining an inlet port and an outlet port;
   a filter, removably connected to said cabinet, said filter being positioned on an exterior surface of said cabinet to filter air entering said inlet port; and
   a fan disposed within said cabinet and connectible to a source of power, said fan being positioned between said inlet port and said interior space to draw air into said cabinet interior space through said inlet port and to direct said air into said interior space to create a positive pressure environment within said interior space relative to the environment surrounding said console.

2. The console according to claim 1, wherein said inlet port is defined in a vertical upstanding sidewall of said cabinet.

3. The console according to claim 1, wherein said filter is slidably mounted in a channel configured on said cabinet.

4. The console according to claim 1, wherein said fan is positioned adjacent said inlet port.

5. The console according to claim 4, wherein said fan is associated with said cabinet in a sealed connection with said inlet port.

6. The console according to claim 1, wherein said cabinet includes a door for accessing said interior space, said door including a seal positioned proximate a perimeter of said door for sealingly engaging a sidewall of said cabinet.

7. The console according to claim 6, wherein said seal is configured to sealingly engage an electrical cord interposed between said door and said cabinet sidewall.

8. The console according to claim 1, wherein a plenum is formed in said cabinet.

9. The console according to claim 1, wherein said cabinet defines a laterally extending recess configured to slidably receive and retain a keyboard.

10. The console according to claim 1, wherein said cabinet defines a second compartment configured to receive and retain a video display monitor electrically associated with said control processing unit.

11. The console according to claim 10, wherein said outlet is positioned in a sidewall of said cabinet defining said second compartment.

12. A console for housing a computer central processing unit adapted for protecting said computer central processing unit in a harsh environment in combination with a computer central processing unit, said combination comprising:
   a cabinet defining an interior space dimensioned to receive and retain said central processing unit;
   said cabinet defining an inlet port and an outlet port;
   a computer central processing unit positioned within said interior space of said cabinet and enclosed by said cabinet;
   a filter covering an exterior of said inlet port, wherein said filter is slidably received by said cabinet and positioned to filter air entering said inlet port; and
   a fan disposed within said cabinet and connectible to a source of power, said fan being positioned between said inlet port and said interior space to draw air into said cabinet interior space through said inlet port and to direct said air into said interior space to create a positive pressure environment within said interior space relative to the environment surrounding said console.

* * * * *